3,832,322
AROMATIC FLUORO-POLYIMIDES
John Phillip Critchley, Farnham, England, assignor to
 The Secretary of State for Defence in Her Britannic
 Majesty's Government of the United Kingdom of Great
 Britain and Northern Ireland, London, England
No Drawing. Filed Oct. 15, 1971, Ser. No. 189,793
Claims priority, application Great Britain, Oct. 21, 1970,
 49,945/70; Aug. 19, 1971, 38,942/71
Int. Cl. C08g 51/04, 51/78
U.S. Cl. 260—37 N                                18 Claims

ABSTRACT OF THE DISCLOSURE

Aromatic fluoropolyimide co-polymer compositions suitable for use as high temperature adhesives are provided which include the repeating unit:

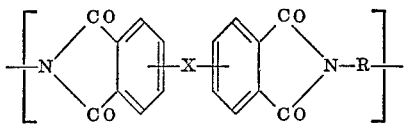

wherein X is a divalent linking atom or group, advantageously, a direct link, —O—, —S—, —CO—, —SO$_2$—, —CH$_2$—, or —(CF$_2$)$_n$— where $n$ is an integer from two to eight inclusive and R represents divalent aromatic groups having the formulae:

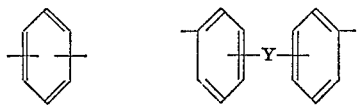

wherein Y is a divalent linking atom or group and is advantageously —O—, —S—, —CO—, —SO$_2$—, —CONH—, —CH$_2$—, or —(CF$_2$)$_n$— where $n$ is as integer from two to eight inclusive and about 10 to 50 moles percent of said divalent aromatic groups have at least one direct nuclear substituent selected from organocarbonylamino groups, preferably acylamino groups, a carboxylic acid group, and alkoxy-carbonyl groups. Preferably there are present, a first direct nuclear substituent which is an organocarbonylamino group, preferably acylamino and a second direct nuclear substituent which is a carboxylic acid group or an alkoxycarbonyl group, the said first and second direct nuclear substituents being present in substantially equimolar proportions, and being attached to separate aromatic nuceli.

The present invention is concerned with aromatic polyimides containing fluoroalkylene groups in the polymer chain and with particular copolymers thereof which are suitable for use as adhesives capable of operating at elevated temperatures and with adhesive compositions containing the said polyimide copolymers.

Patent Specification No. 1,216,505 discloses aromatic polyimides which contain fluoroalkylene groups in the polymer chain. These polymers have relatively good thermal stability and show some promise as adhesives. However, these polyimides are thermoplastic and although joints using these polyimides have useful strengths at room temperature they rapidly lose strength as the temperature is increased and the polyimide becomes thermoplastic.

It is an object of the present invention to provide modified aromatic polyimides which do not suffer from the same degradation of properties under increased temperature as unmodified fluoroalkylene linked aromatic polyimides.

In accordance with the present invention there is provided aromatic polyimide copolymers, or their obvious poly(amic acid) equivalents (as hereinafter defined) which include the repeating unit

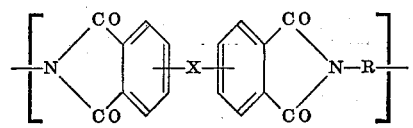

wherein X is a divalent linking atom or group, advantageously, a direct link, —O—, —S—, —CO—, —SO$_2$—, —CH$_2$—, or —(CF$_2$)$_n$— where $n$ is an integer from two to eight inclusive and R represents divalent aromatic groups having the formulae:

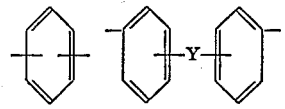

wherein Y is a divalent linking atom or group and is advantageously —O—, —S—, —CO—, —SO$_2$—, —CONH—, —CH$_2$—, or —(CF$_2$)$_n$— where $n$ is an integer from two to eight inclusive and about 10 to 50 moles percent of said divalent aromatic groups have at least one direct nuclear substituent selected from organocarbonylamino groups, preferably acylamino groups, a carboxylic acid group, and alkoxy-carbonyl groups.

In accordance with an aspect of the present invention when only a single direct nuclear substituent is present it is preferably an acylamino group.

In accordance with a second aspect of this invention, advantageously, two direct nuclear substituents are present, a first direct nuclear substituent which is an organocarbonylamino group, preferably acylamino and a second direct nuclear substituent which is a carboxylic acid group or an alkoxycarbonyl group, the said first and second direct nuclear substituents being present in substantially equimolar proportions, and being attached to separate aromatic nuclei.

Polyimides are generally prepared by a reaction of aromatic tetracarboxylic acid dianhydrides with aromatic diamines which proceeds by the intermediate formation which proceeds by the intermediate formation of amic acids, which may be cyclised, normally by heat, to the imide rings. An alternative exists in which a di-N,N' organo carbonyl (e.g. acyl) derivative of an aromatic diamine is reacted. Each of the intermediates, as a part formula, is illustrated below as leading to the phthalimido group in order to emphasize the chemical relationship.

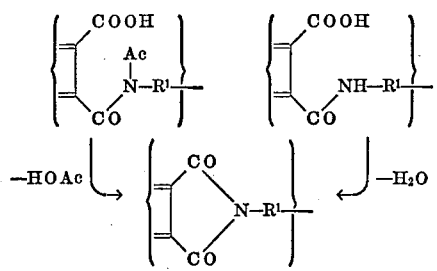

Although in general the non-cyclised amic acid intermediates tend to be unstable, particularly those not substituted on the nitrogen atom, and therefore of limited practical use, for the purposes of the present specification and in appropriate cases the polyimide formula is to be construed as including the above illustrated non-cyclised structures as obvious poly(amic acid) equivalents.

Advantageously aromatic polyimide copolymers in accordance with the first aspect of the present invention are represented by the formula:

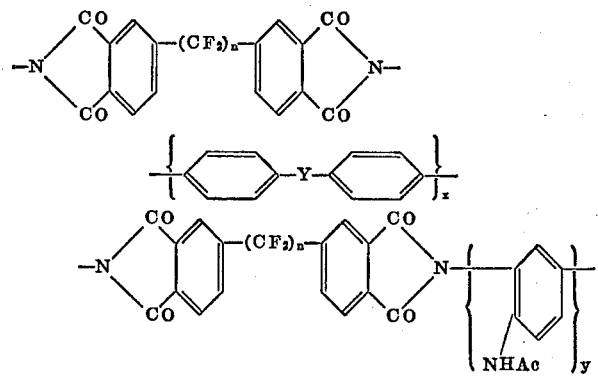

wherein $n$ is an integer from two to eight inclusive, Y is a divalent linking atom or group and is advantageously —O—, —S—, —CO—, —SO$_2$—, —CONH—, —CH$_2$—, or (CF$_2$)$_n$— wherein $n$ is an integer from two to eight inclusive and the ratio $x:y$ is within the range 19:1 to 7:3.

In preferred aromatic polyimide copolymers of the first aspect of this invention in the immediately preceding formula $n=3$, Y is —O—, and the ratio $x:y$ is 17:3.

A cross-linking agent, which is the tetraester of an aromatic tetracarboxylic acid wherein the ester groups are arranged in pairs and each pair is attached to adjacent nuclear aromatic carbon atoms may be added to aromatic polyimide copolymers of the first aspect of the present invention. Advantageously the cross-linking agent has the formula:

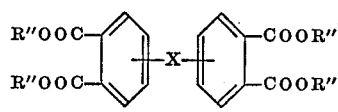

wherein X is a direct link or a divalent linking atom, advantageously —O—, —S—, —SO$_2$—, —CH$_2$—, or —(CF$_2$)$_n$ where $n$ is an integer from two to eight inclusive and R" is a lower alkyl group with less than eight carbon atoms. Preferably X is a direct link and R" is methyl. It is believed that such cross-linking agents or reaction produce cross-links by producing imide rings.

A variation of this cross-linking reaction may be obtained wherein the cross linking agent is an aromatic diester and advantageously has the formula:

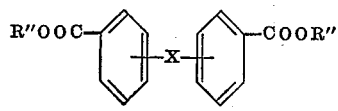

wherein X is a direct link or a divalent linking atom, advantageously —O—, —S—, —SO$_2$—, —CH$_2$—, or —(CF$_2$)$_n$— where $n$ is an integer from two to eight inclusive and R" is a lower alkyl group with less than eight carbon atoms. Preferably X is —O— and R" is methyl. It is believed that these latter cross-linking agents produce amide links.

Each of these cross-linking agents is normally added in a proportion equimolar with the proportion of acylamino single direct nuclear substituent. Advantageously the proportions are 15 moles percent.

Advantageously in aromatic polyimide copolymers of the second aspect of the present invention the first and the second direct nuclear substituents are substituted on separate single aromatic nuclei and the remainder of the divalent aromatic groups, R, have two linked aromatic nuclei. It has been found advantageous for the purposes of the present invention for the orientation of the divalent aromatic nuclei to be either *meta* or *para*.

In preferred aromatic polyimide copolymers of the second aspect of the present invention —X— is —(CF$_2$)$_n$— where $n$ is an integer from two to eight inclusive, the first and second direct nuclear substituents are attached to separate single aromatic nuclei and are present to the extent of about 10 to 20 moles percent each.

Particularly preferred aromatic polyimide copolymers of the second aspect of the present invention are represented by the formula:

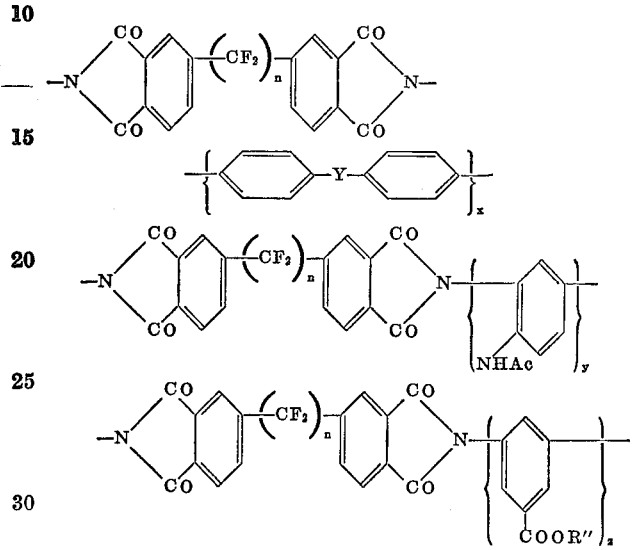

wherein $n$ is an integer from two to eight inclusive, Y is a divalent linking atom or group advantageously —O—, —S—, —CO—, —SO$_2$—, —CH$_2$—, or —(CF$_2$)$_n$ where $n$ is an integer from two to eight inclusive, R" is a lower alkyl group with less than eight carbon atoms and the ratio $x:y:z$ is in the range 8:1:1 to 3:1:1.

In preferred aromatic polyimide copolymers of the second aspect of this invention in the immediately preceding formula $n=3$, Y is —O— and the ratio $x:y:z$ is 14:3:3.

It is to be understood that the acidic and amino components of all of the compounds of the present invention may be mixtures. For example aromatic polyimide copolymers of the first or second aspects of the present invention may include acid moities in which $n$ is 2, 4, 6 or 8. Other preferred aromatic polyimide copolymers of the present invention may include acid moities with fluoromethylene chains of mixed length and also other linking groups, such as carbonyl. The acid moities may also include a proportion of single ring tetracarboxylic acids, for example up to 15 moles percent, and preferably 10 moles percent of the acid moiety may be pyromellitic acid residue.

Aromatic polyimides of the general class, disclosed above, but lacking direct nuclear substituents are thermoplastic and on heating above a particular temperature, which is a characteristic of the particular polyimide, the polymer softens and therefore cannot be used as an adhesive for such temperatures. However, when an aromatic polyimide of the present invention is heated to an elevated temperature the direct nuclear substituents in the polymer chains react, presumably with the elimination of simple compounds and, it is believed, the formation of cross-links. This reaction occurs in general at temperatures of the order of 250° C. to 370° C. but will vary from system to system. The occurrence of the cross-linking reaction is readily verified since after cross-linking the polyimide is insoluble.

The nature of the cross-linking reaction is not fully understood so far as aromatic polyimides of the present invention containing only single direct nuclear substituents although it is believed to be understood for materials of the second aspect of the present invention. However, this statement of mechanism is not to be construed as limiting on the scope of the invention.

When an aromatic polyimide of the second aspect of the present invention is heated to an elevated temperature the first and second direct nuclear substituents in adjacent polymer chains react with one another with the elimination of simple organic compounds and it is believed the formation of —NH·CO— cross links. This reaction occurs in general at temperatures of the order of 250 to 370° C. but will vary from system to system.

When the second direct nuclear substituent is a carboxylic acid group and the first direct nuclear substitutent is an acylamino group the eliminated compound is a carboxylic acid, which is disadvantageous because of the possible deleterious effect of the acid upon the properties of the adhesive bond. This may be overcome if the second direct nuclear substitutent is an alkoxycarbonyl since the eliminated compound in this instance is an ester.

Any of the aromatic groups in the aromatic polyimides of the present invention may be substituted so long as the substitutents are not labile at elevated temperatures and so long as such substitutents do not interfere with the cross-linking reaction.

Polyimides of the present invention may be prepared by conventional means by reacting a tetracarboxylic acid dianhydride with mixtures of appropriate aromatic diamines in appropriate molar proportions. The initial product is a poly(amic acid) as hereinbefore described which may be subsequently heated to cyclise the amic acid and produce the imide rings.

In accordance with a further aspect of the present invention a process for the production of a fluorinated aromatic polyimide includes the steps of reacting together in a solvent, or in bulk, a tetracarboxylic acid dianhydride of the formula:

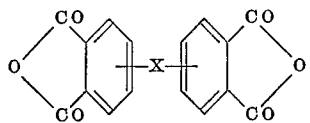

or its functionally equivalent derivative where X is as defined above and a substantially equimolar proportion of a diamine reactant, or its functionally equivalent derivative, which includes 50 to 90 moles percent of an aromatic diamine having the formula:

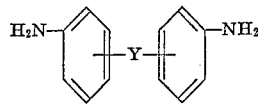

where Y is as hereinbefore defined the remainder of the diamine reactant being phenylene diamines or aromatic diamines as defined immediately above which have a functional group which is an organocarbonylamino group, preferably an acylamino group, a carboxylic acid group or an alkoxycarbonyl group each attached directly to aromatic nuclei, or optionally there may be first and second functional groups which are organocarbonylamino, preferably acylamino and a carboxylic acid or alkoxycarbonyl groups respectively and which are present in separate diamine compounds and in substantially equivalent proportions.

It is to be understood that the acid reactant and the amine reactant may both by mixtures of particular anhydrides or diamines within the scope of the above definitions.

In preferred processes in accordance with this further aspect of the present invention the aromatic diamines containing the first and second functional groups are single ring aromatic compounds and particularly preferred compounds include, 2,4 - diaminoacetanilide, 3,5 - diaminobenzoic acid and ethyl 3,5-diaminobenzoate, while the unsubstituted aromatic diamine is 4,4' - diaminodiphenyl ether.

Any of the aromatic compounds used in the above reaction may contain other nuclear substituents so long as they do not interfere with the polymerisation or with the cross-linking reaction described earlier or are labile at a temperature likely to interfere with the adhesive properties at elevated temperatures of the polyimide product.

The aromatic polyimides hereinbefore described may be used on their own as adhesive compositions or they may be compounded with fillers etc., for example glass fibre cloth, such as are normally used in the adhesive art and in accordance with a further aspect of the present invention and adhesive composition includes an aromatic polyimide as hereinbefore defined impregnated in a glass fibre cloth.

Also inorganic additives such as $As_2O_3$, $Sb_2S_3$, $MnO_2$, $As_2O_5$, $Cu_2S$, $Sn_2S_3$, $SnO_2$ and $ZnO$ may be added in proportions of up to 5% by weight in order to improve retention of strength after long periods at high temperatures. Advantageously 2% by weight of $As_2O_3$ or $Sb_2S_3$ is added.

As previously indicated aromatic polyimide copolymers of the present invention are useful as adhesives for use at high temperature, about 300° C., say, and they are particularly useful as adhesive for metals to be subjected to high temperatures. Particular metals which may be bonded by adhesives of the present invention, include steel, aluminium, chromium, tin-nickel alloy and titanium.

By way of example only, the preparation of aromatic polyimide copolymers illustrative of the present invention will now be described together with test results for use of these polyimides as adhesives.

EXAMPLE 1

This is in accordance with the second aspect of the present invention.

The starting materials were purified as follows: 4,4'-diaminodiphenyl ether (hereafter DPE) was sublimed four times at 180° C./$10^{-4}$ mm. Hg; 2,4-diaminoacetanilide (DAA) was recrystallised three times from ethanol; ethyl 3,5-diaminobenzoate (EDAB) was prepared from the corresponding dinitrocompound by reduction and had an uncorrected melting point of 77–78° C. after recrystallisation from water; 1,3-bis-(3,4-dicarboxyphenyl) hexafluoropropane dianhydride (DBDA) was sublimed four times at 180° C./$10^{-4}$ mm. Hg, treated with pure dioxan to form the dioxanate, filtered, allowed to crystallise and the free dianhydride was liberated by heating under vacuum, m.pt. 171–172° C.; and the solvent, dimethylacetamide (DMAC), was distilled over $P_2O_5$ and stored over $5/\mu$ molecular sieve material.

The diamines, EDAB (0.7299 g., 0.004 mole), DAA (0.6692 g., 0.004 mole) and DPE (3.7842 g., 0.01990 mole) were dissolved in approximately 4/5 of a total of 98.9 g. DMAC with stirring at room temperature to give a clear colourless solution. DBDA (12.0002 g., 0.270 mole) was added portionwise through a powder funnel with a good nitrogen flow. The solutions were kept rigorously dry throughout the entire operation. The solution of poly(amic acid) became pale yellow and there was a slight exothermal reaction. The remainder of the DMAC was used to wash in the last traces of DBDA and the reaction solution then contained accurately 15% solids. Stirring was continued at room temperature and after one hour the inherent viscosity of a 0.1% solution in DMAG (obtained by dilution of the reaction mixture with the solvent) at 30° C. was 1.003 dl./g. and after 4 hours 1.496 dl./g.

The poly(amic acid) solution was stored refrigerated. The polymer was obtained in a form suitable for use as an adhesive by casting as a film and by impregnation in glass cloth.

Preparation of Film

Still working under nitrogen, a portion of the solution was cast on to a glass plate and about 65–70% of the solvent was removed by heating at 80° C. After 2–3 hours the film of poly(amic acid) was removed from the glass plate, care being necessary to avoid tearing the film since the poly(amic acid) adheres strongly to glass. The film was clamped to a mild steel frame and heated for 1 hour at 180° C. in a forced draft oven to convert the poly(amic acid) to polyimide. After this heat treatment the film was somewhat brittle, had a density of about 1.4 g./ml., a thickness of 0.005 to 0.007 inches and an inherent viscosity of 0.40 dl./g. measured at a concentration of 0.1% by weight in dimethtylformamide (hereafter DMF) at 30° C.

Impregnation of Glass Coth

Two types of glass cloth were used, a coarse type which had 16 fibres/inch and a weight of 9.4 g. for a nine inch square and a fine type which had 26 threads/inch and a weight of 4.1 g. for a nine inch square.

The poly(amic acid) solution originally produced had a solids content of 15% by weight and to aid impregnation the solution was diluted to half strength, i.e. 7.5% solids by weight.

For fine scrim 80 g. of 7.5% by weight solids solution of poly(amic acid) in DMAC was poured on to a fluorinated ethylene propylene (FEP) film on a flat glass plate and the fine glass cloth placed on the solution. Air was displaced by continued rolling after which the impregnated cloth on the FEP/glass plate was placed in an oven and heated at 80° C. for 2½–3 hours in an atmosphere of nitrogen. The impregnated cloth was then peeled off the FEP film and mounted on a mild steel frame and heated at 180° C. in a forced draft oven for 1 hour to form the polyimide. The final product had a thickness of 0.005–0.007 inches.

Coarse cloth was prepared in the same manner except that 125° g. of the 7.5% by weight solids solution were used and the final product had a thickness of 0.010 to 0.015 inches.

The film and the cloth materials prepared were used as adhesives to join stainless steel adherends and the strength of the joints tested for torsion shear strength using "napkin ring" specimens and for tensile shear strength using lap specimens.

The curing schedules for the joints were within the range of up to 340° C. with dwell times in the range 1 to 48 hours at pressures in the range of 50 to 200 p.s.i., specific schedules are quoted below.

The adhesive films and the steel adherends were thoroughly degreased by solvents before use.

The film material was used to bond two stainless steel "napkin rings" together using a curing cycle of 20° C. to 250° C. in 2 hours, held at 250° C. for 3 hours, raised to 340° C. in 0.5 hours and then held at that temperature for 12 hours; the bonding pressure was 200 p.s.i. throughout. The resulting torsional shear strength was 14,200 p.s.i. at room temperature and 7,800 p.s.i. at 300° C.

Another bonded specimen was prepared as above save that the final cure was for 12 hours at 340° C. and after heat ageing at 300° C. for 1080 hours the torsional shear strength was 7,000 p.s.i. when measured at room temperature and 5,300 p.s.i. when measured at 300° C.

A tensile shear strength (lap shear) specimen was prepared from stainless steel specimen 4 x 1 x 0.044 inches with an overlap area of 0.5 square inches using the film material described above and a curing schedule of 20° C. to 250° C. at 3° C./minute, held at 250° C. for 3 hours, then heated to 340° C. and held there for 12 hours using a bonding pressure of 100 p.s.i. throughout. The tensile shear strength of the bond formed was 3050 p.s.i. at 20° C.

The fine glass cloth described above was used to bond two stainless steel "napkin rings" together using a curing cycle of 20° C. to 250° C. at 3° C./minute, held at 250° C. for 3 hours; temperature increased to 330° C. in 26 minutes and held there for 12 hours; the bonding pressure was 200 p.s.i. throughout. The resulting torsional shear strength was 10,100 p.s.i. at room temperature and 3,800 p.s.i. at 300° C.

EXAMPLE 2

This is in accordance with the first aspect of the present invention.

The starting materials were purified as described in Example 1.

The diamines, DAA (0.2062 g., 0.00125 mole) and DPE (0.5831 g., 0.00291 mole) were dissolved in approximately 4/5 of a total of 15.5 g. DMAC with stirring at room temperature to give a clear colourless solution. DBDA (1.8481 g., 0.00416 mole) was added portionwise through a powder funnel with a good nitrogen flow. The solutions being kept rigorously dry. The solution initially became yellow but after a short while lost this colour, only a very slight exotherm was noted. The remainder of the DMAC was used to wash in the last traces of DBDA to give an accurately assessed 10% solids. $\eta_{inh}$ (0.18% solution in DMAC after 2 hours) at 30° C.$=1.64$ dl./g. The poly(amic acid) solution was stored refrigerated.

Preparation of Film

Still working under nitrogen, a portion of the solution was cast on to a Mellinex surface stretched to drum tightness and approximately 70% of the solvent removed by heating at 80° C. After 2–3 hours the film of poly(amic acid) was removed from the Mellinex surface. The film was clamped to a mild steel frame and heated for 1½ hours at 180° C. in a forced draft oven to convert the poly(amic acid) to polyimide. $\eta_{inh}$ of polyimide film (0.1% solution in DMAC at 30° C.)$=0.33$ dl./g.

The above preparation gives polyimide films with 30% acylamino cross-links. Other formulations have been made similarly but with 5% and 15% cross-links.

The film materials were used to bond stainless steel adherends (napkin rings) which were then cured under 200 lb./in.$^2$ pressure at 340° C. for 17 hours.

Table 1 following gives the properties of the bonds formed.

TABLE 1

| Proportion of acylamino cross-links, percent | Bond strength, p.s.i. | | | |
| --- | --- | --- | --- | --- |
| | Room temperature | 300° C. | After 1,000 hours at 300° C | |
| | | | Room temperature | 300° C. |
| 5 | 7,500 | 2,500 | | |
| 15 | 13,000 | 5,000 | 10,500 | 4,500 |
| 30 | 12,500 | 5,000 | | |

EXAMPLE 3

The starting materials were purified as previously described.

The diamines EDAB (0.2253 g., 0.00125 mole) and DPE (0.5831 g., 0.002914 mole) were dissolved in about 4/5 total of 16.1 g. DMAC with stirring at room temperature to give a clear colourless solution. DBDA (1.8485 g., 0.00416 mole) was added through a powder funnel with a good nitrogen flow, the solutions being kept rigorously dry. An initial yellow colour and slight exotherm were observed but the colour faded after all the DBDA was added. A 15% solids solution was obtained having $\eta_{inh}$ (0.18% solution after 2 hours) 30° C.$=1.1$ dl./g. The poly(amic acid) solution was stored refrigerated.

Preparation of Film

Still working under nitrogen a portion of the solution was cast onto a Mellinex surface, stretched drum tight, and approximately 70% of the solvent removed by heating at 80° C. After 2–3 hours the film of poly(amic acid) was removed from the Mellinex surface. The film was clamped to a mild steel frame, and heated for 1½ hours at 180° C. in a forced draft oven to convert the poly-(amic acid) to polyimide. $\eta_{inh}$ of polyimide film (0.1% in DMAC at 30° C.)$=0.75$ dl./g.

These polyimide films have a 30 mole percent concentration of ethyl ester groups and were used to bond stainless steel adherends (napkin rings) cured at 340° C. and 200 p.s.i. for 17 hours.

On testing, the bond strength was 9,500 p.s.i. at room temperature and 3,300 p.s.i. at 300° C.

EXAMPLE 4

This example relates to the addition of tetraesters to form cross-links and the starting materials were purified as before.

The diamines DAA (0.3097 g., 0.0019 mole) and DPE (2.1274 g., 0.0106 mole) were dissolved in approximately 4/5 of the required total of 45.28 g. of DMAC with stirring at room temperature to form a clear colourless solution. DBDA (5.5530 g., 0.0125 mole) was added through a powder funnel, portionwise with a good nitrogen flow. The solution being kept rigorously dry. The initial yellow colour quickly disappeared after all the DBDA was washed in with the remaining DMAC to give a 15% solids solution. $\eta_{inh}$ (0.6% solution in DMAC after 2 hours) at 30° C. was 1.3 dl./g.

Exactly one sixth of the solution (7.61 g.) was taken and the tetramethyl ester of diphenyl-3,3',4,4'-tetracarboxylic acid (0.1048 g., 0.000271 mole) dissolved in a little DMAC was added with stirring thereto. After the solution became homogenous it was cast on to a Mellinex surface as previously described, the solvent removed, and the film then cyclised as before by heating at 180° C. for 1½ hours at the end of which time $\eta_{inh}$ (0.1% solution in DMAC at 30° C.) was 0.28 dl./g.

The material was used to bond stainless steel adherends (napkin rings) by curing under 200 p.s.i. at 340° C. for 17 hours and the resulting bond had a strength of 13,000 p.s.i. when measured at room temperature and 2,750 p.s.i. when measured at 300° C.

EXAMPLE 5

This relates to the production and testing of an adhesive which includes a mixture of acid moities.

The starting materials were purified as previously described, and benzophenone - 3,3',4,4' - tetracarboxylic acid dianhydride (BPDA) was recrystallized four times from acetic anhydride and dried under 0.1 mm. Hg pressure.

The diamines DAA (0.1115 g., 0.000675 mole), EDAB (0.1216 g., 0.000675 mole) and DPE (0.6307 g., 0.00315 mole) were dissolved in dry DMAC with stirring (4/5 of a total of 21 g. of DMAC) at room temperature under nitrogen, to give a colourless solution. The following four dianhydrides were accurately weighed into weighing tubes, 1,4 - bis(3,4 - dicarboxyphenyl) octafluorobutane dianhydride (0.4447 g., 0.0009 mole), 1,6 - bis(3,4 - dicarboxyphenyl) dodecafluorohexane dianhydride (0.5345 g., 0.0009 mole), 1,8 - bis(3,4 - dicarboxyphenyl) hexadecafluorooctane dianhydride (0.3124 g., 0.00045 mole), BPDA (0.7245 g., 0.00225 mole), and then mixed thoroughly under nitrogen. The mixture was then stirred into the solution of diamines and the last traces washed in with remaining DMAC to give a 12% solids solution, $\eta_{inh}$ after 5 hours (0.1% solution at 30° C.)=0.84 dl./g.

Preparation of Polyimide Film

Still working under nitrogen, a portion of the solution was cast onto a Mellinex surface as previously described and approximately 70% of the solvent removed by heating at 80° C. After 2–3 hours the film of poly(amic acid) was removed and clamped into mild steel frames and heated for 1½ hours in a forced draft oven to convert the poly(amic acid) to polyimide. $\eta_{inh}$ of the polyimide film (0.1% solution in DMAC at 30° C.) was 0.36 dl./g.

The film material was used to bond stainless steel adherends (napkin rings) by curing under 200 p.s.i. at 340° C. for 17 hours after which the material had 15% cross-links and on testing showed a bond strength of 8,500 p.s.i. at room temperature and 3,100 p.s.i. at 300° C.

EXAMPLE 6

This relates to the inclusion of inorganic additives in the adhesive. The starting materials were purified as previously described.

The diamines, DAA (0.4516 g., 0.0027 mole), EDAB (0.4927 g., 0.0027 mole), and DPE (0.5542 g., 0.0128 mole) were dissolved in a 4/5 of a total of 66.3 g. of DMAC stirred at room temperature under nitrogen to give a colourless solution. DBDA (8.1 g., 0.018 mole), was added portionwise through a powder funnel with a good nitrogen flow. The solution was kept rigorously dry. On addition a slight exotherm occurred and a yellow colour appeared which rapidly disappeared on stirring after the final DBDA had been washed in with the remaining DMAC to obtain an accurately 15% solids solution. $\eta_{inh}$ of the poly(amic acid) solution after 2 hours (0.55% solution at 30° C.) was 1.03 dl./g.

8.1 g. of the poly(amic acid) solution was weighed out successively and the following inorganic oxides and sulphides added A MnO$_2$ 0.0398 g. (2.7%)
B Sb$_2$S$_3$ 0.0298 g. (2%)
C As$_2$O$_3$ 0.0298 g. (2%)
D Unfilled Control These additives were slurried with a small amount of DMAC and added with stirring to the respective poly (amic acid) solutions.

Films were prepared on Mellinex as previously described and used to bond stainless steel adherends (napkin rings) by curing under 200 p.s.i. pressure at 340° C. for 17 hours. Table 2 below gives the results of bond strength tests.

TABLE 2

| Additive | Tested at room temperature (p.s.i.) | Tested at room temperature after 200 hours at 300° C. (p.s.i.) | Tested at 300° C. after 200 hours at 300° C. (p.s.i.) |
| --- | --- | --- | --- |
| MnO$_2$ | 15,400 | 12,700 | 4,700 |
| Sb$_2$S$_3$ | 15,800 | 13,500 | 5,000 |
| As$_2$O$_3$ | 15,900 | 15,200 | 5,200 |
| Unfilled control | 16,000 | 13,900 | 3,900 |

I claim:

1. As a composition of matter an aromatic polyimide copolymer represented by the formula:

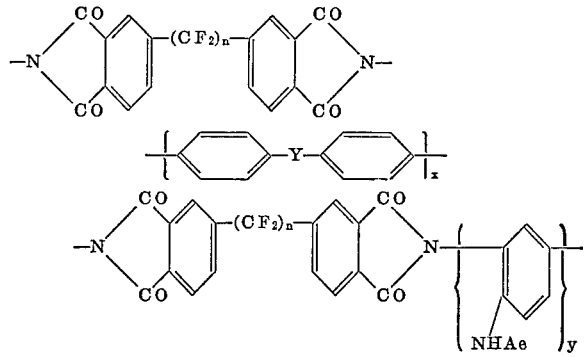

wherein $n$ is an integer from two to eight inclusive, Y is a divalent linking atom or group selected from the group —O—, —S—, —CO—, —SO$_2$—, —CONH—, —CH$_2$—, or (CF$_2$)$_n$— where $n$ is an integer from two to eight inclusive and the ratio $x:y$ is within the range 19:1 to 7:3.

2. A composition as claimed in claim 1 wherein $n$ is three, $y$ is —O—, and the ratio $x:y$ is 17:3.

3. A composition as claimed in claim 1 and which includes a cross-linking agent which has the formula:

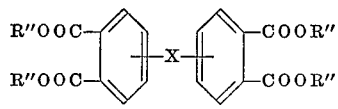

wherein X is selected from the group consisting of a direct link, —O—, —S—, —SO$_2$—, —CH$_2$—, or —(CF$_2$)$_n$— where $n$ is an integer from two to eight inclusive, and R" is a lower alkyl group with less than eight carbon atoms.

4. A composition as claimed in claim 1 and which includes a cross-linking agent which has the formula:

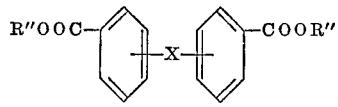

wherein X is selected from the group consisting of a direct link, —O—, —S—, —SO$_2$?, —CH$_2$—, or —(CH$_2$)$_n$— where $n$ is an integer from two to eight inclusive and R" is a lower alkyl group with less than eight carbon atoms.

5. A composition as claimed in claim 3 wherein X is a direct link and R" is methyl and wherein the cross-linking agent is present in a proportion equimolar with the proportion of acylamino single direct nuclear substituent.

6. A composition as claimed in claim 4 wherein X is a direct link and R" is methyl and wherein the cross-linking agent is present in a proportion equimolar with the proportion of acylamino single direct nuclear substituent.

7. A composition as claimed in claim 1 and including an inorganic additive selected from As$_2$O, Sb$_2$S$_3$, MnO$_2$, As$_2$O$_5$, Cu$_2$S, Sn$_2$S$_3$, SnO$_2$ and ZnO in a proportion of up to 5% by weight.

8. A composition as claimed in claim 1 and including 2% by weight of As$_2$O$_3$ or Sb$_2$S$_3$.

9. A composition as claimed in claim 1 when impregnated in glass fibre cloth.

10. As a composition of matter an aromatic polyimide copolymer represented by the formula:

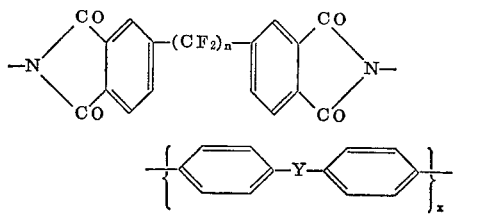

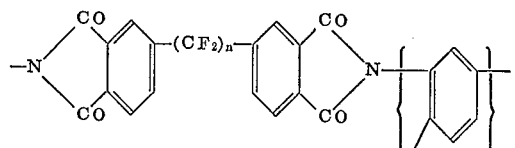

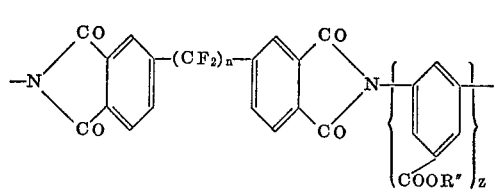

wherein $n$ is an integer from two to eight inclusive, Y is selected from the group consisting of —O—, —S—, —CO—, —SO$_2$—, —CH$_2$— or —(CF$_2$)$_n$— where $n$ is an integer from two to eight inclusive, R" is a lower alkyl group with less than eight carbon atoms and the ratio $x:y:z$ is in the range 8:1:1 to 3:1:1.

11. A composition as claimed in claim 10 wherein $n$ is three, Y is —O— and the ratio $x:y:z$ is 14:3:3.

12. A composition as claimed in claim 10 and including an inorganic additive selected from As$_2$O$_3$, Sb$_2$S$_3$, MnO$_2$, As$_2$O$_5$, Cu$_2$S, Sn$_2$S$_3$, SnO$_2$ and ZnO in a proportion of up to 5% by weight.

13. A composition as claimed in claim 10 and including 2% by weight of As$_2$O$_3$ or Sb$_2$S$_3$.

14. A composition as claimed in claim 10 when impregnated in glass fibre cloth.

15. As a composition of matter an aromatic polyimide copolymer represented by the formula

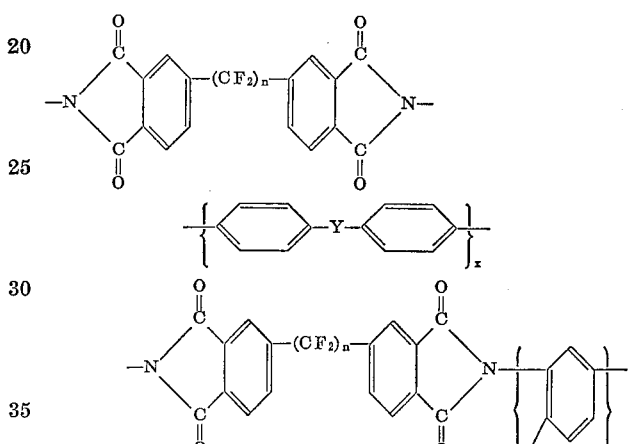

wherein $n$ is an integer from two to eight inclusive, Y is a divalent linking atom or group selected from the group consisting of —O—, —S—, —CO—, —SO$_2$—,

—CONH—,

—CH$_2$—, or —(CF$_2$)$_n$— where $n$ is an integer from two to eight inclusive and the ratio $x:y$ is within the range 19:1 to 17:3, and which includes an inorganic additive selected from As$_2$O$_3$, Sb$_2$S$_3$, MnO$_2$, As$_2$O$_5$, Cu$_2$S, SnS$_3$, SnO$_2$ and ZnO in a proportion of up to 5% by weight.

16. As a composition of matter an aromatic polyimide copolymer represented by the formula

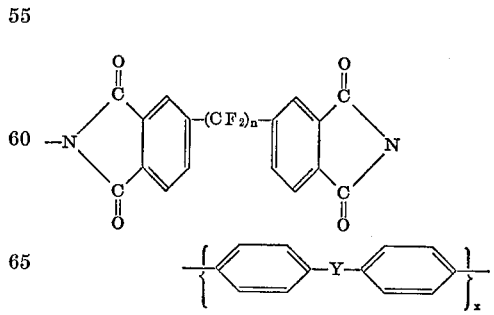

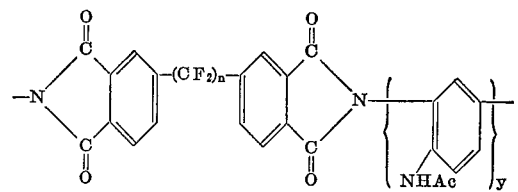

wherein $n$ is an integer from two to eight inclusive, Y is a divalent linking atom or group selected from the group consisting of —O—, —S—, —CO—, —SO$_2$—,

—CONH—,

—CH$_2$—, or —(CF$_2$)$_n$— where $n$ is an integer from two to eight inclusive and the ratio $x:y$ is within the range 19:1 to 17:3 and which includes 2% by weight of As$_2$O$_3$ or SbS$_3$.

17. As a composition of matter an aromatic polyimide copolymer represented by the formula

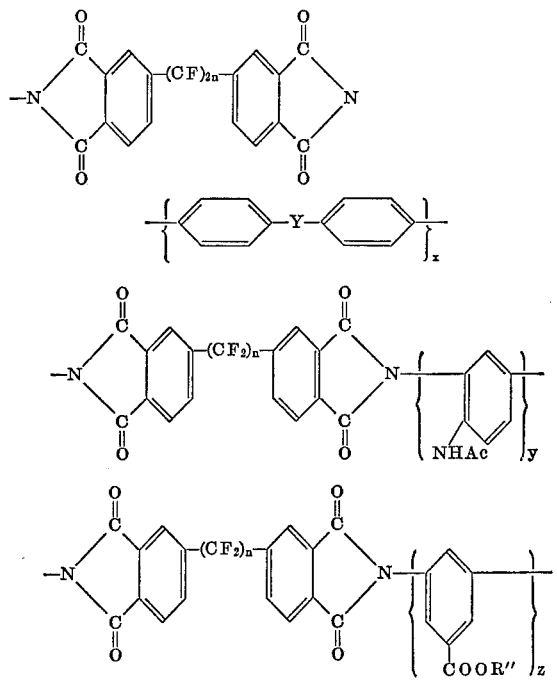

wherein $n$ is an integer from two to eight inclusive, Y is a divalent linking atom or group selected from the group consisting of —O—, —S—, —CO—, —SO$_2$—,

—CONH—,

—CH$_2$—, or —(CF$_2$)$_n$ is an integer from two to eight inclusive, R" is a lower alkyl group with less than eight carbon atoms, the ratio $x:y:z$ is in the range 8:1:1 to 3:1:1 and which includes an inorganic additive selected from AsO$_2$O$_3$, Sb$_2$S$_3$, MnO$_2$, As$_2$O$_5$, Cu$_2$S, SnS$_3$, SnO$_2$ and ZnO in a proportion of up to 5% by weight.

18. As a composition of matter an aromatic polyimide copolymer represented by the formula

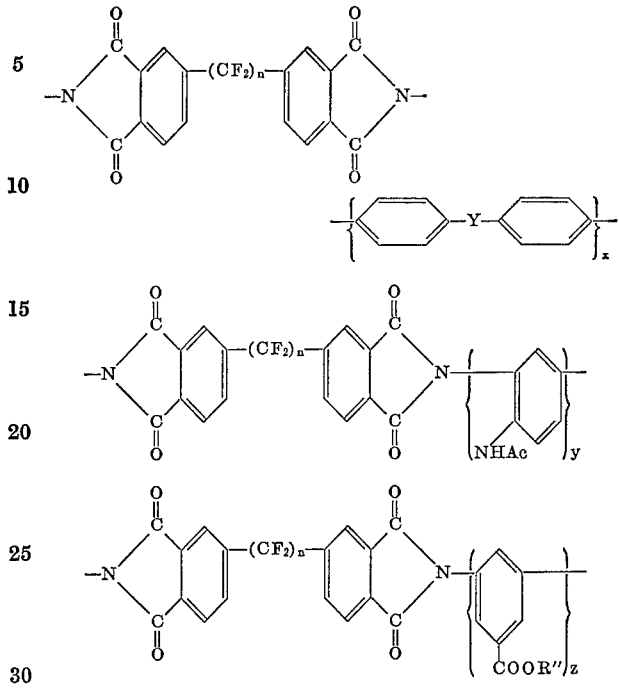

wherein $n$ is an integer from two to eight inclusive, Y is a divalent linking atom or group selected from the group consisting of —O—, —S—, —CO—, —SO$_2$—,

—CONH—,

—CH$_2$—, or —(CF$_2$)$_n$ is an integer from two to eight inclusive, R" is a lower alkyl group with less than eight carbon atoms, the ratio $x:y:z$ is in the range 8:1:1 to 3:1:1 and which includes 2% by weight of As$_2$O$_3$ or SbS$_3$.

References Cited
UNITED STATES PATENTS

| | | | |
|---|---|---|---|
| 3,649,601 | 4/1972 | Critchley | 260—78 TF |
| 3,179,634 | 4/1965 | Edwards | 260—18 |
| 3,416,994 | 12/1968 | Chalmers | 161—227 |
| 3,554,969 | 1/1971 | Long | 260—47 |
| 3,179,630 | 4/1965 | Edrey | 260—78 |
| 3,356,648 | 12/1967 | Rogers | 260—47 |
| 3,649,601 | 4/1972 | Critchley | 260—78 TF |
| 3,526,610 | 9/1970 | Bower | 260—65 |
| 3,533,997 | 10/1970 | Angelo | 260—47 |
| 3,492,720 | 1/1970 | Parish | 260—47 |

ALLAN LIEBERMAN, Primary Examiner
RICHARD H. ZAITLEN, Assistant Examiner

U.S. Cl. X.R.
260—45.15 R

UNITED STATES PATENT OFFICE
CERTIFICATE OF CORRECTION

Patent No. __3,832,322__    Dated __27 August 1974__

Inventor(s) __Critchley__

It is certified that error appears in the above-identified patent and that said Letters Patent are hereby corrected as shown below:

Column 1, line 59, the specification should be identified as the United Kingdom specification.

Column 2, line 45 and 46, "which proceeds by the intermediate formation" appears twice; one should be deleted.

Column 10, line 75, "y" should be --Y--.

Column 13, penultimate line, the formula for arsenic trioxide should read --$As_2O_3$--.

Column 14, line 36, delete "$-(CF_2)_n$" and insert -- $-(CF_2)_n-$ --.

Signed and Sealed this twenty-third Day of March 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,832,322
DATED : August 27, 1974
INVENTOR(S) : John P. Critchley

It is certified that error appears in the above-identified patent and that said Letters Patent are hereby corrected as shown below:

Column 1, line 59, if not already corrected by the earlier Certificate of Correction, before "Patent" read --United Kingdom--

Column 6, line 12 read "and" as --an--

Column 10, line 26 read "$AS_2O_3$" as --$As_2O_3$--

Column 11, line 24 read "-$SO_2$?," as -$SO_2$-,

Column 14, line 36 instead of the change effected by the earlier Certificate of Correction, read "-$(CF_2)_n$" as -- -$(CF_2)_n$- where n--

Signed and Sealed this

*fourth* Day of *May 1976*

[SEAL]

Attest:

RUTH C. MASON
*Attesting Officer*

C. MARSHALL DANN
*Commissioner of Patents and Trademarks*